United States Patent
Zhang

(10) Patent No.: US 10,834,303 B2
(45) Date of Patent: Nov. 10, 2020

(54) VERIFICATION METHOD, VERIFICATION DEVICE, ELECTRONIC DEVICE AND COMPUTER READABLE STORAGE MEDIUM

(71) Applicant: GUANGDONG OPPO MOBILE TELECOMMUNICATIONS CORP., LTD., Guangdong (CN)

(72) Inventor: Xueyong Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/424,463

(22) Filed: May 28, 2019

(65) Prior Publication Data
US 2019/0379814 A1 Dec. 12, 2019

(30) Foreign Application Priority Data
Jun. 6, 2018 (CN) .......................... 2018 1 0575117

(51) Int. Cl.
*H04N 5/232* (2006.01)
*G06F 21/32* (2013.01)
(Continued)

(52) U.S. Cl.
CPC ............. *H04N 5/232* (2013.01); *G06F 21/32* (2013.01); *G06K 9/00288* (2013.01);
(Continued)

(58) Field of Classification Search
CPC .. G06F 21/32; G06F 21/31; G06F 2221/2149; G06K 9/00288; G06K 9/209;
(Continued)

(56) References Cited

U.S. PATENT DOCUMENTS 10,579,865 B2* 3/2020 Yoo ..................... G06K 9/00288
2005/0014527 A1* 1/2005 Chambers ........... H04M 1/0264
455/556.1
(Continued)

FOREIGN PATENT DOCUMENTS

CN 202168120 3/2012
CN 105513221 4/2016
(Continued)

OTHER PUBLICATIONS

EPO, Office Action for EP Application No. 19178710.0, dated Oct. 17, 2019.
(Continued)

*Primary Examiner* — Nathnael Aynalem
(74) *Attorney, Agent, or Firm* — Hodgson Russ LLP

(57) ABSTRACT

The present disclosure provides a verification method. The verification method includes: driving the movable component to extend out from the housing, in which the movable component is received in the housing and capable of extending out from the housing; determining whether the light entrance of the infrared camera is completely exposed from the housing, wherein the infrared camera is installed on the movable component and can be driven by the movable component; when the light entrance of the infrared camera is completely exposed from the housing, obtaining an infrared image by the infrared camera; and performing an infrared image verification based on the infrared image. The present disclosure also provides a verification device and an electronic device.

18 Claims, 10 Drawing Sheets

(51) Int. Cl.
G06K 9/00 (2006.01)
H04N 5/225 (2006.01)
H04N 5/33 (2006.01)

(52) U.S. Cl.
CPC ............. H04N 5/2252 (2013.01); H04N 5/33 (2013.01); *G06F 2221/2149* (2013.01)

(58) Field of Classification Search
CPC ............. G06K 9/6289; H04M 1/0235; H04M 1/0264; H04M 1/67; H04M 2250/52; H04M 1/0214; H04M 2250/20; H04M 1/72527; H04M 1/72583; H04M 2250/12; H04N 5/2252; H04N 5/232; H04N 5/33; H04N 5/2257; H04N 13/239; H04N 2007/145; H04N 2101/00; H04N 5/2254; H04N 5/2256; H04N 5/23219
USPC ................................. 348/37, 47, 51; 345/173
See application file for complete search history.

(56) References Cited

U.S. PATENT DOCUMENTS

| | | | | |
|---|---|---|---|---|
| 2005/0157195 | A1* | 7/2005 | Ohashi | H04M 1/0214 348/333.06 |
| 2006/0152576 | A1* | 7/2006 | Kiessling | H04M 1/0256 348/14.01 |
| 2008/0058010 | A1* | 3/2008 | Lee | H04M 1/0264 455/556.1 |
| 2008/0064437 | A1* | 3/2008 | Chambers | H04N 1/00307 455/556.1 |
| 2012/0169850 | A1* | 7/2012 | Kim | H04N 5/2252 348/47 |
| 2013/0086674 | A1 | 4/2013 | Horvitz et al. | |
| 2014/0013417 | A1* | 1/2014 | Sakai | G06F 3/005 726/16 |
| 2015/0168999 | A1 | 6/2015 | Small et al. | |
| 2015/0189175 | A1* | 7/2015 | Fan | H04N 5/2251 348/37 |
| 2017/0091434 | A1* | 3/2017 | Proulx | G06F 21/57 |
| 2017/0126937 | A1* | 5/2017 | Evans, V | H04N 5/2252 |
| 2017/0126979 | A1* | 5/2017 | Evans, V | H04N 5/2254 |
| 2017/0244903 | A1* | 8/2017 | Yang | H04N 5/2257 |
| 2018/0262663 | A1* | 9/2018 | Zhang | G03B 29/00 |
| 2018/0373924 | A1* | 12/2018 | Yoo | G06K 9/4628 |
| 2019/0014201 | A1* | 1/2019 | Bao | H04N 5/2257 |
| 2019/0130171 | A1* | 5/2019 | Alameh | G06T 7/593 |
| 2019/0132971 | A1* | 5/2019 | Zeng | H01F 7/06 |
| 2019/0250667 | A1* | 8/2019 | Fan | G06F 1/1626 |
| 2019/0253537 | A1* | 8/2019 | Fan | H04M 1/0266 |
| 2019/0253540 | A1* | 8/2019 | Fan | H04M 1/0264 |
| 2019/0297251 | A1* | 9/2019 | Huang | H04M 1/0264 |

FOREIGN PATENT DOCUMENTS

| | | |
|---|---|---|
| CN | 105554196 | 5/2016 |
| CN | 205320124 | 6/2016 |
| CN | 106713549 | 5/2017 |
| CN | 106899721 | 6/2017 |
| CN | 106991377 | 7/2017 |
| CN | 107295129 | 10/2017 |
| CN | 107529002 | 12/2017 |
| CN | 107734099 | 2/2018 |
| CN | 107844744 | 3/2018 |
| CN | 107888728 | 4/2018 |
| CN | 107911584 | 4/2018 |
| CN | 107944422 | 4/2018 |
| CN | 108006401 | 5/2018 |
| CN | 108763911 | 11/2018 |

OTHER PUBLICATIONS

SIPO, Notification of Completion of Formalities for Patent Register for CN Application No. 201810575117.0, Sep. 19, 2019.
WIPO, English translation of the ISR and WO for PCT/CN2019/080457, Jul. 1, 2019.
SIPO, First Office Action of CN Application No. 201810575117, dated Feb. 25, 2019.

* cited by examiner

VERIFICATION METHOD, VERIFICATION DEVICE, ELECTRONIC DEVICE AND COMPUTER READABLE STORAGE MEDIUM

CROSS REFERENCE TO RELATED APPLICATIONS

This application claims priority to Chinese Patent Application No. 201810575117.0, filed Jun. 6, 2018, the entire disclosure of which is incorporated herein by reference.

TECHNICAL FIELD

The present disclosure relates to a field of biological recognition technology, and more particularly, to a verification method, a verification device, an electronic device, and a computer readable storage medium.

BACKGROUND

Generally, a face unlocking component can be disposed on a front cover of a mobile phone, and the face unlocking component occupies a space on the mobile phone for arranging a display screen, such that a screen-to-body ratio of the mobile phone is relatively small.

SUMMARY

Embodiments of the present disclosure provide a verification method, a verification device, an electronic device, and a computer readable storage medium.

The verification method according to embodiments of the present disclosure includes: driving a movable component to extend out from a housing, wherein the movable component is received in the housing and capable of extending out from the housing; determining whether a light entrance of an infrared camera is completely exposed from the housing, wherein the infrared camera is installed on the movable component and can be driven by the movable component; when the light entrance of the infrared camera is completely exposed from the housing, obtaining an infrared image by the infrared camera; and performing an infrared image verification based on the infrared image.

The verification device according to embodiments of the present disclosure includes a processor and a memory. The memory is configured to store instructions executable by the processor. The processor is configured to run a program corresponding to the executable instructions by reading the instructions stored in the memory, so as to: drive a movable component to extend out from a housing, wherein the movable component is received in the housing and capable of extending out from the housing; determine whether a light entrance of an infrared camera is completely exposed from the housing, wherein the infrared camera is installed on the movable component and can be driven by the movable component; control the infrared camera to obtain an infrared image when the light entrance of the infrared camera is completely exposed from the housing; and perform an infrared image verification based on the infrared image.

The electronic device according to embodiments of the present disclosure includes a housing, a movable component, a driving member, an infrared sensor, and a processor. The movable component is received in the housing and capable of extending out from the housing. The driving member is coupled to the movable component and configured to drive the movable component to extend out from the housing. The infrared camera is installed on the movable component, and configured to be driven by the movable component. The processor is configured to determine whether a light entrance of the infrared camera is completely exposed from the housing, and to control the infrared camera to obtain an infrared image when the light entrance of the infrared camera is completely exposed from the housing.

The computer readable storage medium according to embodiments of the present disclosure is configured to store one or more computer executable instructions that, when executed by one or more processors, cause the one or more processors to perform the verification method according to any one of the above embodiments.

Additional aspects and advantages of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
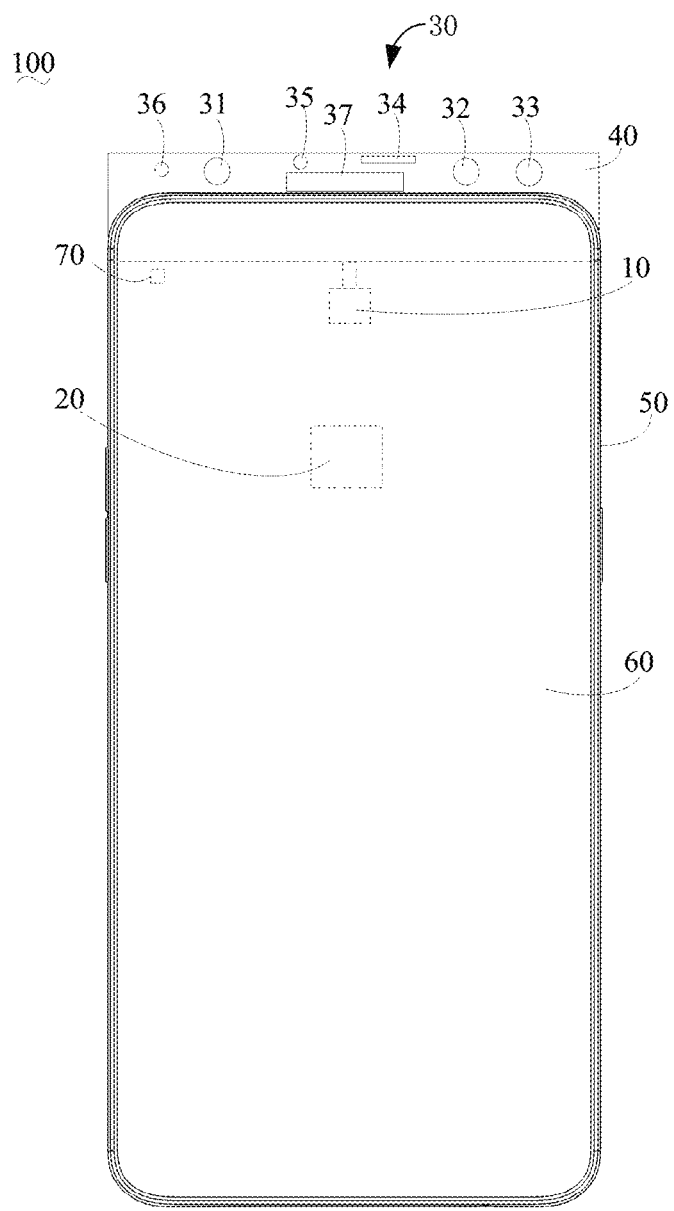
FIG. 1 is a schematic diagram of an electronic device according to embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In the related art, in order to increase a screen-to-body ratio of a mobile phone, a face unlocking component may be hidden under a display screen of the mobile phone when not in user, and may be exposed only when verification is to be performed. However, it takes a long time to expose the entire face unlocking component, which results in an excessive time for face unlocking, reducing user experience.

Therefore, embodiments of the present disclosure provide a verification method, a verification device and an electronic device, which may shorten the wait time of the user for verification.

A verification method according to embodiments of the present disclosure includes:

driving a movable component to extend out from a housing, wherein the movable component is received in the housing and capable of extending out from the housing;

determining whether a light entrance of an infrared camera is completely exposed from the housing, wherein the infrared camera is installed on the movable component and can be driven by the movable component;

when the light entrance of the infrared camera is completely exposed from the housing, obtaining an infrared image by the infrared camera; and performing an infrared image verification based on the infrared image.

In some embodiments, the infrared image verification includes:

determining whether a human face exists in the infrared image;

when a human face exists in the infrared image, determining whether the human face matches a face infrared template of an authorized user; and when the human face matches the face infrared template of the authorized user, determining that an infrared image verification is passed.

In some embodiments, whether the light entrance of the infrared camera is completely exposed from the housing can be determined by determining whether the movable component is driven to a predetermined position, and when the movable component is driven to the predetermined position, the movable component is in a critical position at which a whole of the light entrance of the infrared camera is exposed from the housing.

In some embodiments, a moving speed of the movable component at the predetermined position is zero or non-zero.

In some embodiments, whether the light entrance of the infrared camera is completely exposed from the housing can be determined by determining whether a total duration of the infrared camera being driven in a current verification reaches a predetermined duration, and when the total duration reaches the predetermined duration, it is determined that the light entrance of the infrared camera is completely exposed from the housing.

In some embodiments, the verification method further includes:

obtaining a depth image by the laser projector and the infrared camera, wherein the laser projector is installed on the movable component and can be driven by the movable component;

determining whether the depth image matches a face depth template of the authorized user; and when the depth image matches the face depth template of the authorized user, determining that a depth image verification is passed.

In some embodiments, the depth image is obtained during the infrared image verification, or after the infrared image verification is passed.

In some embodiments, whether the human face exists in the infrared image is determined in a trusted execution environment; and/or whether the human face matches the face infrared template of the authorized user is determined in a trusted execution environment; and/or whether the depth image matches the face depth template of the authorized user is determined in a trusted execution environment.

In some embodiments, when no human face exists in the infrared image, the method is returned to obtaining the infrared image by the infrared camera; and/or When the human face does not match the face infrared template of the authorized user, the method is returned to obtaining the infrared image by the infrared camera.

A verification device according to embodiments of the present disclosure includes a processor and a memory. The memory is configured to store instructions executable by the processor. The processor is configured to run a program corresponding to the instructions by reading the instruction stored in the memory, so as to:

drive a movable component to extend out from a housing, wherein the movable component is received in the housing and capable of extending out from the housing;

determine whether a light entrance of an infrared camera is completely exposed from the housing, wherein the infrared camera is installed on the movable component and can be driven by the movable component;

control the infrared camera to obtain an infrared image when the light entrance of the infrared camera is completely exposed from the housing; and perform an infrared image verification based on the infrared image.

In some embodiments, the processor is configured to:

determine whether a human face exists in the infrared image;

determine whether the human face matches a face infrared template of an authorized user when the human face exists in the infrared image; and determine that the infrared image verification is passed, when the human face matches the face infrared template of the authorized user.

An electronic device according to embodiments of the present disclosure includes a housing, a movable component, a driving member, an infrared camera and a processor. The movable component is received in the housing and capable of extending out from the housing. The driving member is configured to drive the movable component to extend out from the housing. The infrared camera is installed on the movable component and can be driven by the movable component.

The processor is configured to determine whether a light entrance of an infrared camera is completely exposed from the housing, and to control the infrared camera to obtain an infrared image when the light entrance of the infrared camera is completely exposed from the housing.

In some embodiments, the processor is further configured to: determine whether a human face exists in the infrared image; when a human face exists in the infrared image, determine whether the human face matches a face infrared template of an authorized user; and when the human face matches the face infrared template of the authorized user, determine that an infrared image verification is passed.

In some embodiments, the electronic device further includes a position detector coupled to the processor, the position detector is configured to detect a position of the movable component, and the processor is configured to determine whether the light entrance of the infrared camera is completely exposed from the housing by determining whether the movable component is driven to a predetermined position, and when the movable component is driven to the predetermined position, the movable component is in a critical position at which a whole of the light entrance of the infrared camera is exposed from the housing.

In some embodiments, a moving speed of the movable component at the predetermined position is zero or non-zero.

In some embodiments, the processor is further configured to:

determine whether a total duration of the infrared camera being driven in a current verification reaches a predetermined duration; and when the total duration reaches the predetermined duration, determine that the light entrance of the infrared camera is completely exposed from the housing.

In some embodiments, the electronic device further includes a laser projector, the laser projector is installed on the movable component and can be driven by the movable component; and the processor is further configured to: obtain a depth image by the laser projector and the infrared camera; determine whether the depth image matches a face depth template of the authorized user; and when the depth image matches the face depth template of the authorized user, determine that a depth image verification is passed.

In some embodiments, the laser projector is turned on to obtain the depth image after the infrared image verification is passed, or during the infrared image verification.

In some embodiments, the processor is configured to determine whether a human face exists in the infrared image in a trusted execution environment; and/or the processor is configured to determine whether the human face matches the face infrared template of the authorized user in a trusted execution environment; and/or the processor is configured to determine whether the depth image matches the face depth template of the authorized user in a trusted execution environment.

In some embodiments, the infrared camera is further configured to reobtain an infrared image when the processor determines that no human face exists in the infrared image; and/or the infrared camera is further configured to reobtain an infrared image when the processor determines that the face does not match the face infrared template of the authorized user.

A computer readable storage medium according to embodiments of the present disclosure is configured to store one or more computer executable instructions that, when executed by one or more processors, cause the one or more processors to execute the verification method according to any one of the above embodiments.

In the following, the verification method, the verification device and the electronic device will be described in detail with reference to the drawings.

As illustrated in FIG. 1, the electronic device 100 according to embodiments of the present disclosure includes a housing 50, a driving member 10, a processor 20, a movable component 40, and an infrared camera 31. The driving member 10 is coupled to the movable component 40. The movable component 40 is received in the housing 50 and capable of extending out from the housing 50. The driving member 10 may be configured to drive the movable component 40 to extend out from the housing 50. The infrared camera 31 is installed on the movable component 40 and can be driven by the movable component 40. During a process in which the driving member 10 drives the movable component 40 to extend out from the housing 50, the infrared camera 31 is also driven to extend out from the housing 50. The processor 20 may be configured to determine whether the light entrance of the infrared camera 31 is completely exposed from the housing 50. When the light entrance of the infrared camera 31 is completely exposed from the housing 50, the infrared camera 31 is configured to obtain an infrared image.

Figure 2:
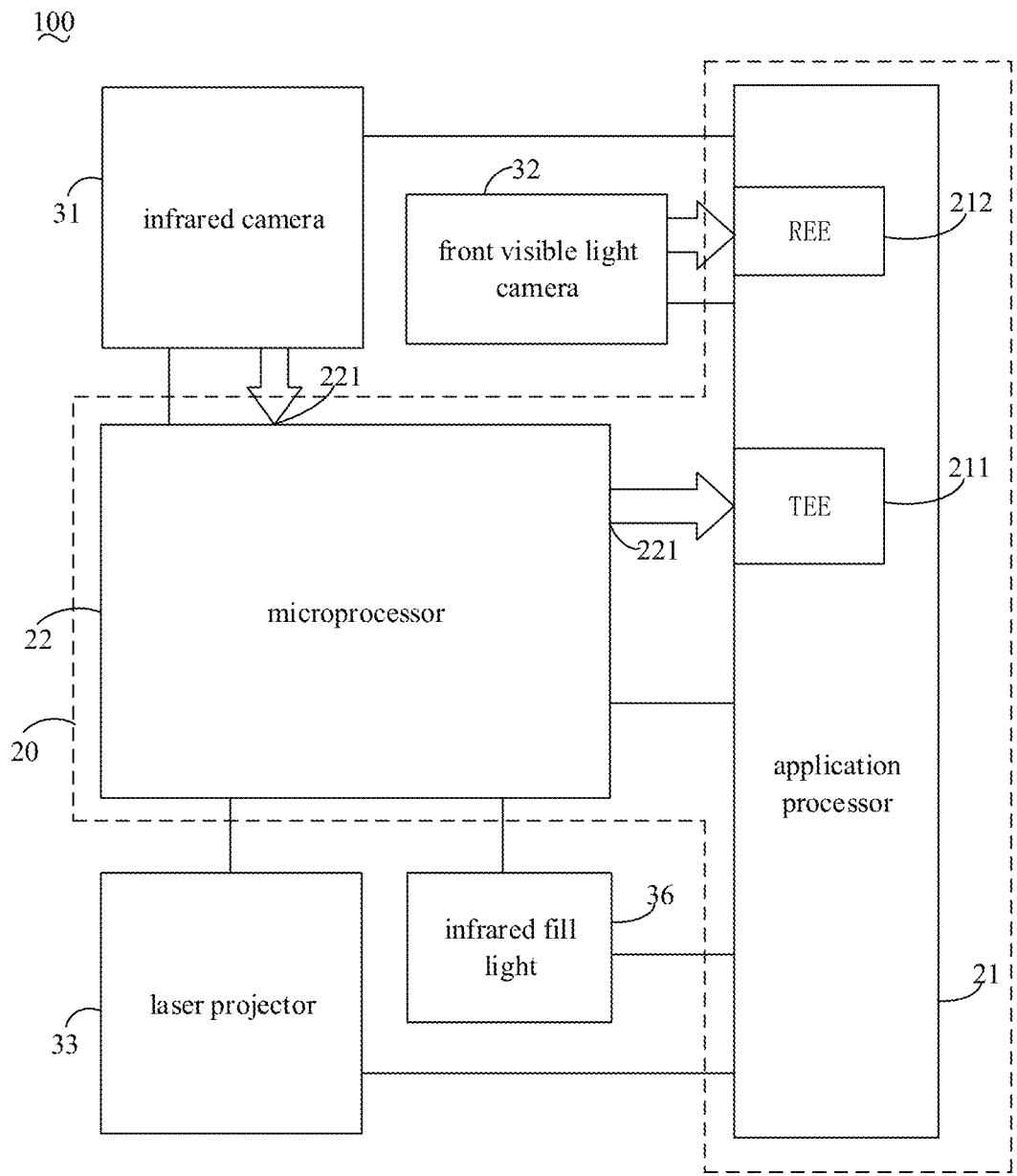
FIG. 2 is another schematic diagram of an electronic device according to embodiments of the present disclosure.

In detail, as illustrated in FIGS. 1 and 2, the electronic device 100 may be a mobile phone, a tablet computer, a smart watch, a smart bracelet, or a smart wearable device. In an embodiment of the present disclosure, illustration is made by taking a mobile phone as an example of the electronic device 100. It can be understood that the specific form of the electronic device 100 is not limited to the mobile phone. The housing 50 of the electronic device 100 may include a front cover and a rear cover, and in some embodiments, the housing 50 may further include a middle frame disposed between the front cover and the rear cover.

The display screen 60 of the electronic device 100 is installed on the housing 50. A display area of the display screen 60 may be comparable to an area of one surface of the front cover, for example, a ratio of the display area to the area of the surface of the front cover may reach 100% or even more, such that the electronic device 100 has a higher screen-to-body ratio. The movable component 40 is coupled to the driving member 10. The movable component 40 is received in the housing 50 when not in use and may be corresponding to the position of the display screen 60. After receiving a driving command, the driving member 10 drives the movable component 40 to move, such that at least a part of the movable component 40 extends out from the housing 50. The movable component 40 may be a holder or a holder assembly composed of a plurality of holders. The driving member 10 is disposed in the housing 50. The driving member 10 may drive the movable component 40 by rack and gear drive or by screw drive.

In this case, the movable component 40 may be equipped with a functional component 30. The functional component 30 may send a signal to the outside or receive a signal from the outside, or may have the function of sending a signal to the outside and receiving a signal from the outside. The signal may be a light signal, a sound signal and a touch signal. In embodiments of the present disclosure, the functional component 30 installed on the movable component 40 may include an infrared camera 31, a front visible light camera 32, a laser projector 33, a receiver 34, a proximity sensor 35, an infrared fill light 36, and a rear visible light camera 37 and the like. Certainly, the user can select different functional components 30 according to different requirements, which is not limited by examples of the embodiments of the present disclosure. The functional component 30 can be driven by the movable component 40 to extend out from the housing 50 or be driven to move back into the housing 50. When the movable component 40 is driven to different positions, a degree of extension of the functional component 30 out from the housing 50 is different. For example, when the movable component 40 is driven to a first position, the light entrance of the infrared camera 31 is completely blocked by the housing 50 and not exposed; when the movable component 40 is driven to a second position, the light entrance of the infrared camera 31 is partially blocked by the housing 50 and partially exposed from the housing 50; when the movable component 40 is driven to a third position, the light entrance of the infrared camera 31 is completely exposed from the housing 50. It can be understood that only when the light entrance of the infrared camera 31 is completely exposed from the housing 50, the infrared image obtained by the infrared camera 31 can completely reflect the current scene.

The processor 20 of the electronic device 100 may be in a form of a single processor 20 or may be formed of a plurality of sub-processors. In embodiments of the present disclosure, the processor 20 includes an application processor 21 and a microprocessor 22. The application processor 21 may be used as a system of the electronic device 100. The user may input a verification instruction on the electronic device 100, the application processor 21 receives the verification instruction, and sends a driving instruction to the driving member 10 according to the verification instruction, and after receiving the driving instruction, the driving member 10 drives the movable component 40 to extend out from the housing 50, and the movable component 40 brings the functional component 30 to extend out from the housing 50. The microprocessor 22 may be a processing chip disposed external to the application processor 21. The microprocessor 22 is coupled to the application processor 21, the infrared camera 31, and the laser projector 33 respectively. Certainly, in other embodiments, the driving instruction is not necessarily generated according to the verification instruction, and may be generated according to other instructions. For example, when the user inputs an answering instruction for answering a call in the electronic device 100, the driving instruction may be further generated; or when the user inputs a recording instruction for recording video in the electronic device 100, the driving command may be further generated.

The application processor 21 may be configured to determine whether the light entrance of the infrared camera 31 is completely exposed from the housing 50. In detail, in embodiments of the present disclosure, the electronic device 100 further includes a position detector 70. The position detector 70 is coupled to the application processor 21. The position detector 70 is configured to detect the position of the movable component 40, and the processor 20 is configured to determine whether the movable component 40 is driven to a predetermined position to determine whether the light entrance of the infrared camera 31 is completely exposed from the housing 50. When the movable component 40 is driven to the predetermined position, the movable component 40 is in a critical position at which the whole of the light entrance of the infrared camera 31 is exposed from the housing 50. In other words, when the movable component 40 is driven to the predetermined position, the light entrance of the infrared camera 31 is exactly completely exposed from the housing 50. In addition, a moving speed of the movable component 40 at the predetermined position may be zero or non-zero, and accordingly, the moving speed of the infrared camera 31 at this time can be zero or not. The position detector 70 may be a Hall position sensor, and the position detector 70 may transmit different electrical signals to the application processor 21 depending on the specific position of the movable component 40.

When the electrical signal received by the application processor 21 indicates that the movable component 40 moves to the predetermined position, the application processor 21 may send a photographing signal to the microprocessor 22, and the microprocessor 22 controls the infrared camera 31 to obtain the infrared image according to the photographing signal. It can be understood that, at this time, the light entrance of the infrared camera 31 is exactly completely exposed from the housing 50, and the infrared image obtained by the infrared camera 31 can completely reflect the current scene. Since there is no need to wait for other components (e.g. the base) of the infrared camera 31 to extend out from the housing 50, and it is unnecessary to wait for the remaining of the functional component 30 (e.g. the laser projector 33) to extend out from the housing 50, the time difference between the time when the infrared camera 31 obtains the infrared image and the time when the user inputs the verification instruction is shorter, which shortens the total time for verification.

Certainly, in other embodiments, the manner of determining whether the light entrance of the infrared camera 31 is completely exposed from the housing 50 is not limited to one of the above examples, and other manners may be used. For example, it is determined by calculating the total duration that the driving member 10 drives the movable component 40 in the current verification. When the duration reaches a predetermined duration, it is considered that the light entrance of the infrared camera 31 is completely exposed from the housing 50. The predetermined duration may be set according to specific requirements of the electronic device 100. For example, the predetermined duration may be set to 20 milliseconds, 50 milliseconds, 88 milliseconds, 200 milliseconds, and the like.

After the infrared camera 31 obtains the infrared image, the infrared image can be transmitted to the microprocessor 22 via a mobile industry processor interface (MIPI) 221, and the microprocessor 22 transmits the image to the application processor 21 through the MIPI 221. The application processor 21 performs an infrared image verification based on the infrared image.

Figure 3:
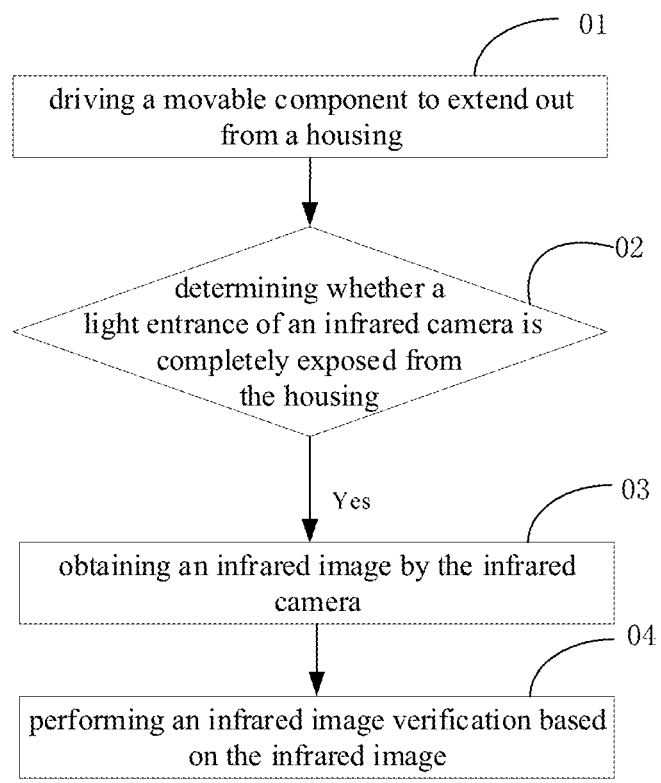
FIG. 3 is a schematic flow chart of a verification method according to embodiments of the present disclosure.

FIG. 3 is a flow chart of a verification method according to embodiments of the present disclosure. As illustrated in FIG. 3, the verification method may include the followings.

At block 01, the movable component 40 is driven to extend out from the housing 50.

At block 02, it is determined whether the light entrance of an infrared camera 31 is completely exposed from the housing 50.

At block 03, when the light entrance of the infrared camera is completely exposed from the housing, an infrared image is obtained by the infrared camera.

At block 04, the infrared image verification is performed based on the infrared image.

Figure 4:
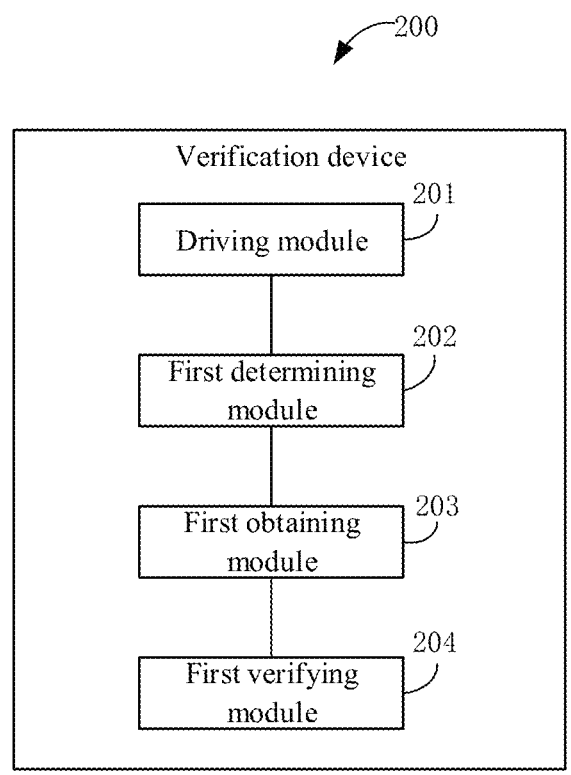
FIG. 4 is a schematic block diagram of a verification device according to embodiments of the present disclosure.

As illustrated in FIG. 4, a verification device 200 is provided. The verification device 200 according to embodiments of the present disclosure includes a driving module 201, a first determining module 202, a first obtaining module 203, and a first verifying module 204. The driving module 201 may be configured to drive the movable component 40 to extend out from the housing 50. The first determining module 202 may be configured to determine whether the light entrance of the infrared camera 31 is completely exposed from the housing 50. The first obtaining module 203 may be configured to obtain an infrared image captured by the infrared camera 31 when the light entrance of the infrared camera 31 is completely exposed from the housing 50. The first verifying module 206 may be configured to perform the infrared image verification based on the infrared image.

In conclusion, in the verification method, the verification device 200, and the electronic device 100 of the embodiments of the present disclosure, as long as the light entrance of the infrared camera 31 is completely exposed from the housing 50, the infrared image can be obtained, without waiting for the whole moving component 40 and the infrared camera 31 to be exposed from the housing 50. Therefore, when there is a need to verify the identity of the user, the user needs to wait for a shorter time, which improves the user experience.

Figure 5:
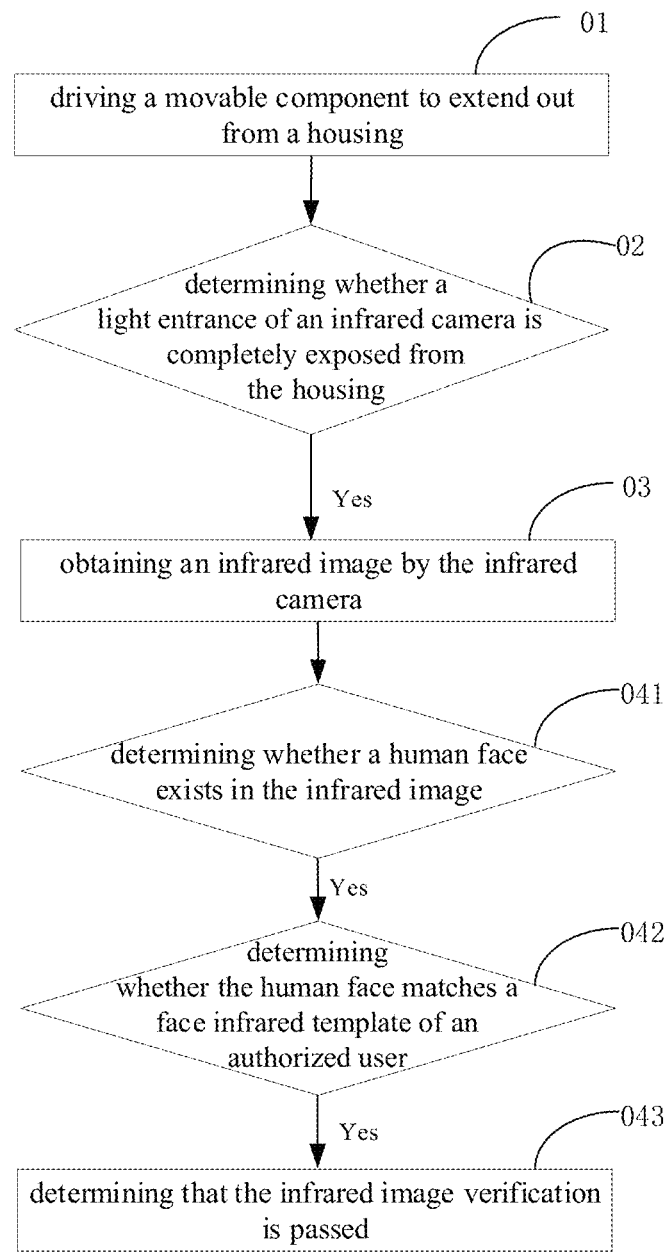
FIG. 5 is a schematic flow chart of a verification method according to embodiments of the present disclosure.

As illustrated in FIG. 5, in some embodiments, the infrared image verification may be performed as follows.

At block 041, it is determined whether a human face exists in the infrared image.

At block 042, when a human face exists in the infrared image, it is determined whether the human face matches a face infrared template of an authorized user.

At block 043, when the human face matches the face infrared template of the authorized user, it is determined that the infrared image verification is passed.

The processor 20 may be configured to implement the acts at blocks 041, 042 and 043. In other words, the processor 20 may be further configured to determine whether a human face exists in the infrared image; when a human face exists in the infrared image, determine whether the human face matches the face infrared template of the authorized user; and determine that the infrared image verification is passed, when the human face matches the face infrared template of the authorized user.

In detail, a trusted execution environment (TEE) 211 is provided in the application processor 21, and the microprocessor 22 directly transmits the infrared image through the MIPI 221 to the TEE 211, and the application processor 21 determines whether a human face exists in the infrared image in the TEE 211, to output a determination result on whether the human face exists or not. The codes and the memory area in the TEE 211 are both controlled by an access control unit and cannot be accessed by programs in a rich execution environment (REE) 212. The infrared image cannot be tampered with or stolen by the programs in the REE 212, and the information security in the electronic device 100 is higher.

When the application processor 21 determines that there is a human face in the infrared image, the application processor 21 further determines whether the human face in the infrared image matches a face infrared template of an authorized user. In detail, the application processor 21 determines, in the REE 211, whether the human face in the infrared image matches the face infrared template of the authorized user, to output the result on whether the human face matches the face infrared template of the authorized user. The face infrared template of the authorized user may be entered into the electronic device 100 in advance by the user before verification, and pre-stored in the REE 211. The face infrared template may be an infrared planar image of the face.

When the application processor 21 determines that the human face matches the face infrared template of the authorized user, it is determined that the infrared image verification is passed. In this case, according to the preset setting of the user on the electronic device 100, the current user may obtain certain rights, such as opening a corresponding application, unlocking the electronic device 100, or authorizing payment.

Figure 6:
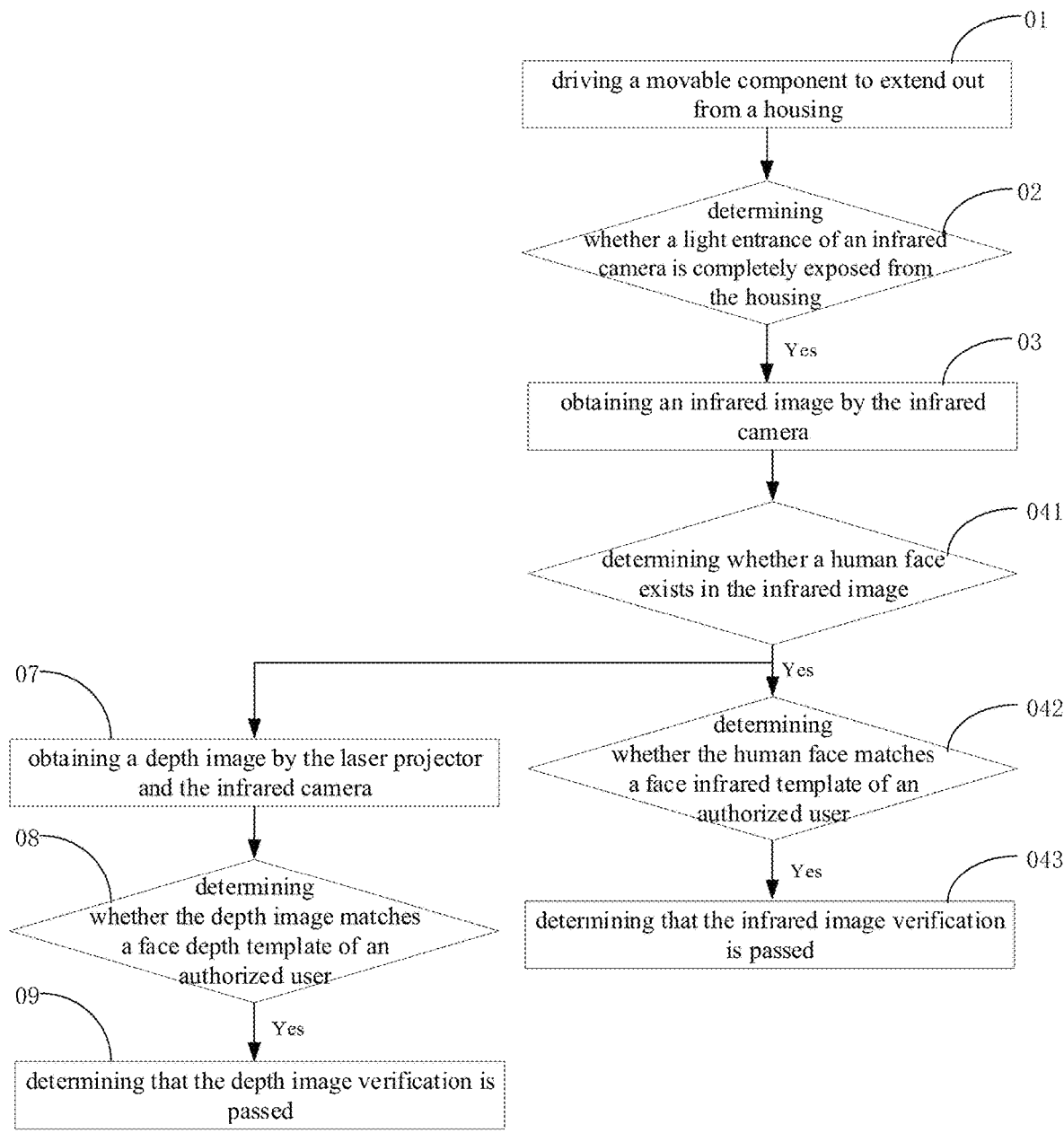
FIG. 6 is a schematic flow chart of a verification method according to embodiments of the present disclosure.
Figure 7:
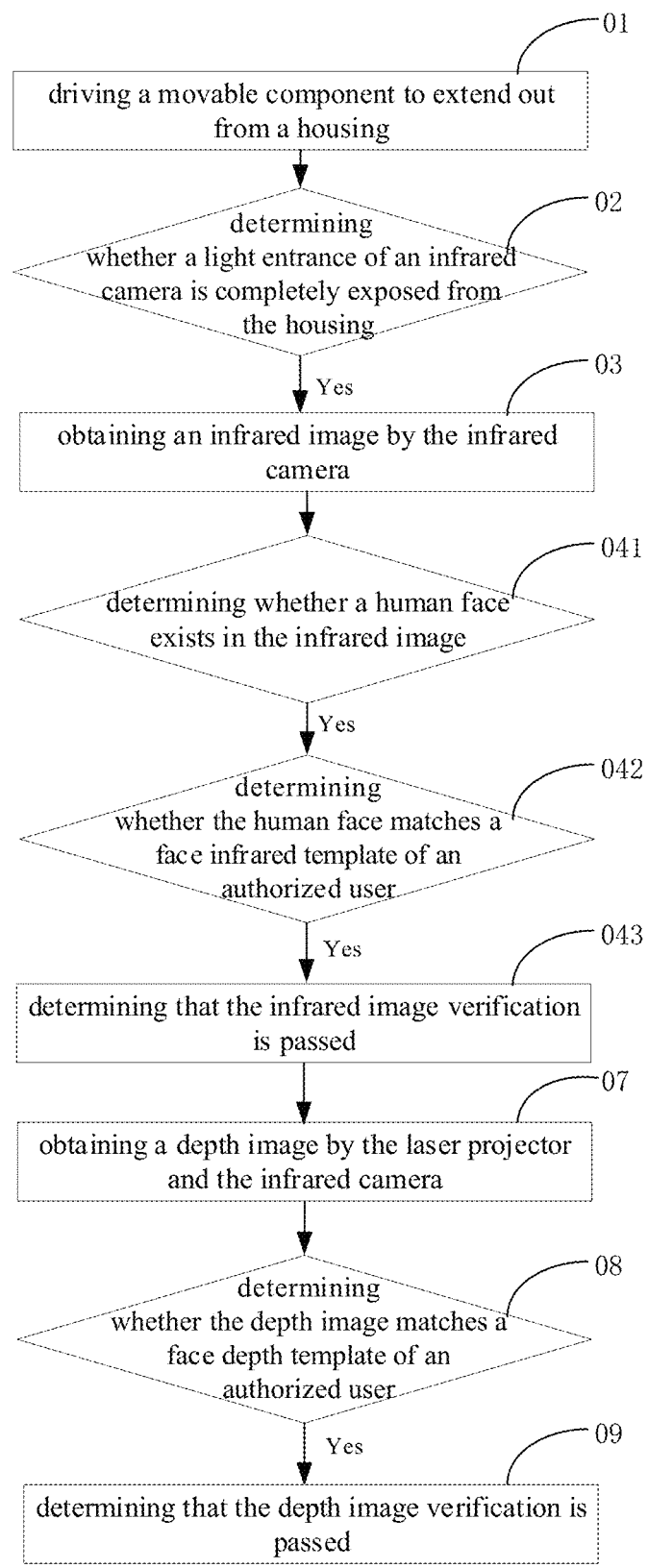
FIG. 7 is a schematic flow chart of a verification method according to embodiments of the present disclosure.

As illustrated in FIGS. 6 and 7, in some embodiments, the verification method further includes the following operations.

At block 07, a depth image is obtained by the laser projector 33 and the infrared camera 31. The laser projector 33 is disposed on the movable component 40 and can be driven by the movable component 40.

At block 08, it is determined whether the depth image matches a face depth template of the authorized user.

At block 09, if the depth image matches the face depth template of the authorized user, it is determined that a depth image verification is passed.

As illustrated in FIG. 6, in an example, the act at block 07 may be implemented simultaneously with the act at block 042. As illustrated in FIG. 7, in another example, the act at block 07 may be implemented after the act at block 043.

Figure 8:
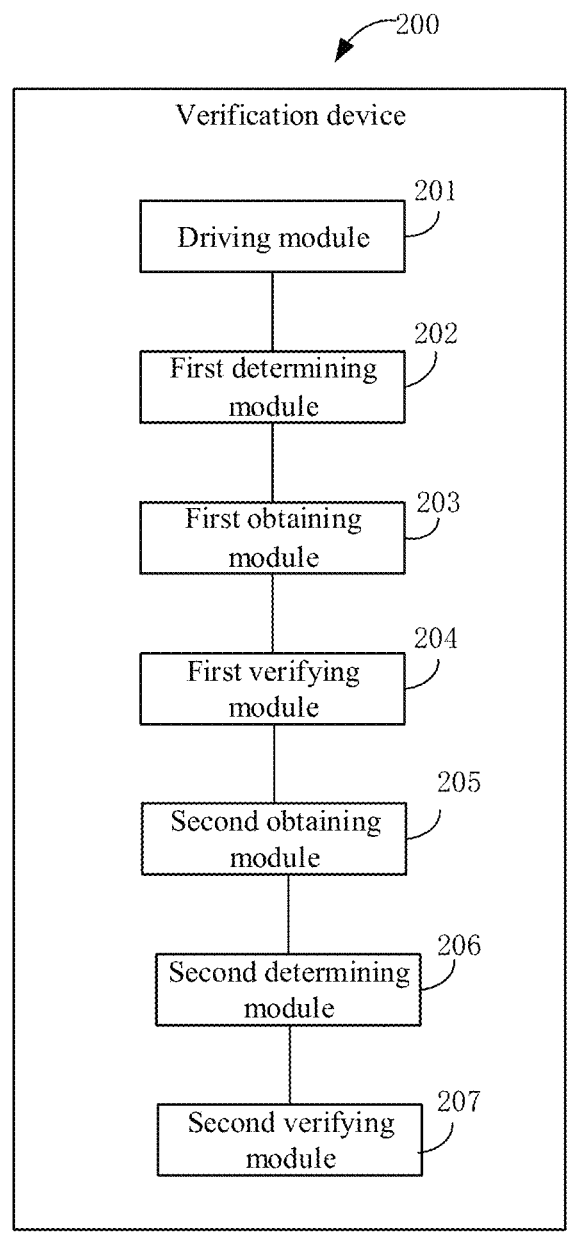
FIG. 8 is a schematic block diagram of a verification device according to embodiments of the present disclosure.

As illustrated in FIG. 8, in some embodiments, the verification device 200 further includes a second obtaining module 205, a second determining module 206, and a second verifying module 207. The second obtaining module 205 may be configured to obtain a depth image by the laser projector 33 and the infrared camera 31. The laser projector 33 is installed on the movable component 40 and can be driven by the movable component 40. The second determining module 206 may be configured to determine whether the depth image matches the face depth template of the authorized user. The second verifying module 207 may be configured to determine that the depth image verification is passed when the depth image matches the face depth template of the authorized user.

As illustrated in FIGS. 1 and 2, in some embodiments, the processor 20 may be configured to implement acts at blocks 07, 08 and 09. In other words, the processor 20 may be configured to obtain a depth image using the infrared camera 31 and the laser projector 33; the processor 20 may be configured to determine whether the depth image matches the face depth template of the authorized user; and the processor 20 may be further configured to determine that the depth image verification is passed, when the depth image matches the face depth template of the authorized user.

The laser projector 33 is installed on the movable component 40. After being driven, the movable component 40 may bring the laser projector 33 to extend out from the housing 50. The laser projector 33 is coupled to the microprocessor 22 and the application processor 21 respectively.

The processor 20 obtains the depth image by the laser projector 33 and the infrared camera 31. In embodiments of the present disclosure, the specific process may be as follows. The microprocessor 22 controls the laser projector 33 to project a laser with a predetermined pattern to the target object. The microprocessor 22 further controls the infrared camera 31 to acquire the laser pattern modulated by the target object, and the laser pattern can be transmitted to the microprocessor 22 through the MIPI 221. The microprocessor 22 may store the calibration information for the laser projected by the laser projector 33, and the microprocessor 22 obtains depth information of the target object at different positions by processing the laser pattern and the calibration information, and forms the depth image.

The microprocessor 22 transmits the depth image to the TEE 211 of the application processor 21 through the MIPI, and the application processor 21 may determine, in the TEE 211, whether the depth image matches the face depth template of the authorized user, to output the result on whether the depth image matches the face depth template of the authorized user. The face depth template of the authorized user may be entered into the electronic device 100 in advance by the user before verification, and pre-stored in the TEE 211. The face depth template may be obtained by means of structured light detection. Since the application processor 21 determines in the TEE 211 whether the depth image matches the face depth template of the authorized user, the depth image would not be accessed by the programs in the REE 212, and the infrared image would not be tampered with or stolen by the programs in the REE 212, and thus the information security in the electronic device 100 is higher.

After the application processor 21 determines that the depth image matches the face depth template of the authorized user, it is determined that the depth image verification is passed. In this case, it can be determined that the current user is same as the user who entered the face depth template, and moreover, it can be determined that the current user in the depth image is not a fake plane image or a face model, and the verification accuracy is high. After the depth image verification is passed, according to the preset setting of the user on the electronic device 100, the current user can obtain certain rights, such as opening the corresponding application, unlocking the electronic device 100, or authorizing payment.

In addition, in an example, the act at block 07 implemented by the processor 20 may be performed simultaneously with the act at block 042 implemented by the processor 20. In this way, when the infrared image and the depth image of the user need to be verified successively, the depth image may be obtained in the process of verifying the infrared image and used to determine whether it matches the face depth template directly after the infrared image verification is passed, which shortens the length of time for completing the verification.

In another example, the act at block 07 implemented by the processor 20 may be performed after the act at block 043 implemented by the processor 20. In this way, when the infrared image and the depth image of the user need to be verified successively, the laser projector 33 is turned on to acquire the depth image only after the infrared image verification is passed. When the infrared image verification is not passed, the laser projector 33 is not turned on, so as to avoid turning on the laser projector 33 too frequently, thus saving electric energy.

Figure 9:
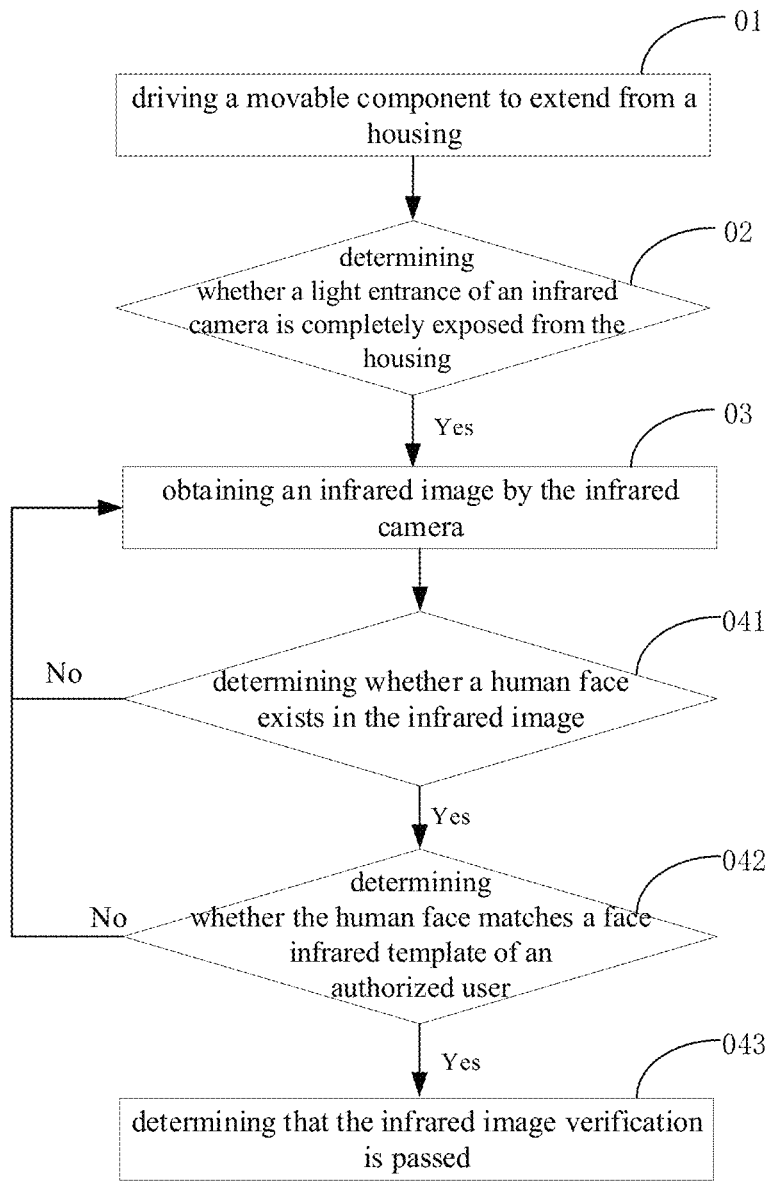
FIG. 9 is a schematic flow chart of a verification method according to embodiments of the present disclosure.

As illustrated in FIG. 9, in some embodiments, if it is determined in the act at block 041 that there is no human face in the infrared image, then the procedure returns to the act at block 03, i.e., the act of acquiring the infrared image through the infrared camera 31 is performed again.

If it is determined in the act at block 042 that the human face does not match the face infrared template of the authorized user, then the procedure returns to the act at block 03, i.e., the act of acquiring the infrared image through the infrared camera 31 is performed again.

As illustrated in FIG. 4, in some embodiments, when the first verifying module 204 determines that there is no human face in the infrared image, the first obtaining module 203 is configured to reobtain an infrared image through the infrared camera 31.

When the first verifying module 204 determines that the human face does not match the face infrared template of the authorized user, the first obtaining module 203 is configured to reobtain the infrared image through the infrared camera 31.

As illustrated in FIGS. 1 and 2, in some embodiments, when the processor 20 determines that there is no human face in the infrared image, the infrared camera 31 is configured to reobtain the infrared image.

When the processor 20 determines that the human face does not match the face infrared template of the authorized user, the infrared camera 31 is configured to reobtain the infrared image.

In detail, in embodiments of the present disclosure, when the application processor 21 determines that there is no human face in the infrared image, the user may not face the mobile phone, or the user may shake the mobile phone and make the face in the infrared image too vague to be recognized. In this case, the infrared camera 31 needs to re-obtain the infrared image, the application processor 21 determines whether there is a human face in the re-obtained infrared image. Further, when the infrared camera 31 reobtains the infrared images for the predetermined number of times (e.g. 3 times, 4 times), and there is no human face in these images, the application processor 21 can issue an instruction to prompt the user, for example, issue an instruction to control the display screen 60 to display a prompt message, for example, "Please use password verification".

When the application processor 21 determines that the human face does not match the face infrared template of the authorized user, it indicates that the current user is not an authorized user, and the infrared camera 31 may not be aligned with the authorized user and is aligned with other unauthorized users. In this case, the infrared camera 31 needs to reobtain the infrared image, and the application processor 21 determines whether the re-obtained infrared image has a human face, and determines whether the face belongs to the authorized user when there is a human face. Further, when the infrared camera 31 reobtains the infrared image for the predetermined number of times (e.g., 3 times, 4 times), and the faces in these images do not match the face infrared template of the authorized user, the application processor 21 can issue an instruction to prompt the user, for example, issues an instruction to control the display screen 60 to display a prompt message such as "Please use password verification".

Figure 10:
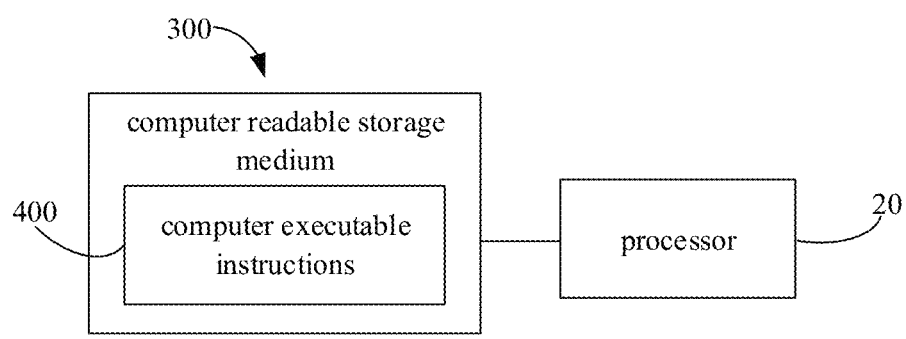
FIG. 10 is a schematic block diagram of a computer readable storage medium and a processor according to embodiments of the present disclosure.

As illustrated in FIG. 10, embodiments of the present disclosure further provide a computer readable storage medium 300. The computer readable storage medium 300 is configured to store one or more computer executable instructions 400 that, when executed by one or more processors 20, cause the one or more processors to perform the verification method of any of the above embodiments, for example, executes the act at block 01, driving the movable component 40 to extend out from the housing 50, wherein the movable component 40 is received in the housing 50 and capable of extending out from the housing 50; the act at block 02, determining whether the light entrance of the infrared camera 31 is completely exposed from the housing 50, wherein the infrared camera 31 is installed on the movable component 40 and can be driven by the movable component 40; the act at block 03, when the light entrance of the infrared camera is completely exposed from the housing, obtaining an infrared image by the infrared camera; and the act at block 04, performing an infrared image verification based on the infrared image.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A verification method, comprising:
   driving a movable component to extend out from a housing, wherein the movable component is received in the housing and capable of extending out from the housing;
   determining whether a light entrance of an infrared camera is completely exposed from the housing, wherein the infrared camera is installed on the movable component and can be driven by the movable component;
   when the light entrance of the infrared camera is completely exposed from the housing, obtaining an infrared image by the infrared camera; and
   performing an infrared image verification based on the infrared image;
   wherein, determining whether the light entrance of the infrared camera is completely exposed from the housing comprises:
   determining whether a total duration of the infrared camera being driven in a current verification reaches a predetermined duration; and
   when the total duration reaches the predetermined duration, determining that the light entrance of the infrared camera is completely exposed from the housing.

2. The verification method according to claim 1, wherein performing the infrared image verification based on the infrared image comprises:
   determining whether a human face exists in the infrared image;
   when a human face exists in the infrared image, determining whether the human face matches a face infrared template of an authorized user; and
   when the human face matches the face infrared template of the authorized user, determining that the infrared image verification is passed.

3. The verification method according to claim 1, wherein, determining whether the light entrance of the infrared camera is completely exposed from the housing comprises:
   determining whether the movable component is driven to a predetermined position, in which when the movable component is driven to the predetermined position, the movable component is in a critical position at which a whole of the light entrance of the infrared camera is exposed from the housing.

4. The verification method according to claim 3, wherein a moving speed of the movable component at the predetermined position is zero or non-zero.

5. The verification method according to claim 2, further comprising:
   obtaining a depth image by a laser projector and the infrared camera, wherein the laser projector is installed on the movable component and can be driven by the movable component;

determining whether the depth image matches a face depth template of the authorized user; and when the depth image matches the face depth template, determining that the depth image verification is passed.

6. The verification method according to claim 5, wherein the depth image is obtained during the infrared image verification, or after the infrared image verification is passed.

7. The verification method according to claim 5, wherein, further comprising one or more of the following:

whether the human face exists in the infrared image is determined in a trusted execution environment;

whether the human face matches the face infrared template of the authorized user is determined in a trusted execution environment; and whether the depth image matches the face depth template of the authorized user is determined in a trusted execution environment.

8. The verification method according to claim 2, further comprising one or more of the following:

when no human face exists in the infrared image, returning to obtaining an infrared image by the infrared camera; and when the human face does not match the face infrared template of the authorized user, returning to obtaining an infrared image by the infrared camera.

9. A verification device, comprising:

a processor; and a memory, configured to store instructions executable by the processor, wherein the processor is configured to run a program corresponding to the instructions by reading the instructions stored in the memory, so as to:

drive a movable component to extend out from a housing, wherein the movable component is received in the housing and capable of extending out from the housing;

determine a total duration of an infrared camera being driven in a current verification reaches a predetermined duration and determine that a light entrance of the infrared camera is completely exposed from the housing when the total duration reaches the predetermined duration, wherein the infrared camera is installed on the movable component and can be driven by the movable component;

control the infrared camera to obtain an infrared image, when the light entrance of the infrared camera is completely exposed from the housing; and perform an infrared image verification based on the infrared image.

10. The verification device according to claim 9, wherein the processor is configured to:

determine whether a human face exists in the infrared image;

determine whether the human face matches a face infrared template of an authorized user when the human face exists in the infrared image; and determine that the infrared image verification is passed, when the human face matches the face infrared template of the authorized user.

11. An electronic device, comprising:

a housing;

a movable component, received in the housing and being capable of extending out from the housing;

a driving member, coupled to the movable component, and configured to drive the movable component to extend out from the housing;

an infrared camera, installed on the movable component, and configured to be driven by the movable component; and a processor, configured to determine whether a light entrance of the infrared camera is completely exposed from the housing, and to control the infrared camera to obtain an infrared image when the light entrance of the infrared camera is completely exposed from the housing;

wherein the processor is further configured to:

determine whether a total duration of the infrared camera being driven in a current verification reaches a predetermined duration; and when the total duration reaches the predetermined duration, determine that the light entrance of the infrared camera is completely exposed from the housing.

12. The electronic device according to claim 11, wherein the processor is further configured to:

determine whether a human face exists in the infrared image;

when a human face exists in the infrared image, determine whether the human face matches a face infrared template of an authorized user; and when the human face matches the face infrared template of the authorized user, determine that an infrared image verification is passed.

13. The electronic device according to claim 11, further comprising:

a position detector, coupled to the processor, and configured to detect a position of the movable component;

wherein the processor is configured to determine whether the light entrance of the infrared camera is completely exposed from the housing by determining whether the movable component is driven to a predetermined position, and wherein when the movable component is driven to the predetermined position, the movable component is in a critical position at which a whole of the light entrance of the infrared camera is exposed from the housing.

14. The electronic device according to claim 13, wherein a moving speed of the movable component at the predetermined position is zero or non-zero.

15. The electronic device according to claim 12, further comprising:

a laser projector, installed on the movable component and configured to be driven by the movable component;

wherein, the processor is further configured to:

receive a depth image obtained by the laser projector and the infrared camera;

determine whether the depth image matches a face depth template of the authorized user; and when the depth image matches the face depth template of the authorized user, determine that a depth image verification is passed.

16. The electronic device according to claim 15, wherein the laser projector is turned on to obtain the depth image after the infrared image verification is passed, or during the infrared image verification.

17. The electronic device according to claim 15, wherein the processor is configured to determine one or more of the following:

whether a human face exists in the infrared image in a trusted execution environment;

whether the human face matches the face infrared template of the authorized user in a trusted execution environment; and whether the depth image matches the face depth template of the authorized user in a trusted execution environment.

18. The electronic device according to claim 12, wherein the infrared camera is further configured to perform one or the more of the following:

reobtain an infrared image when the processor determines that no human face exists in the infrared image; and reobtain an infrared image when the processor determines that the human face does not match the face infrared template of the authorized user.

\* \* \* \* \*